Figures 1, 2:
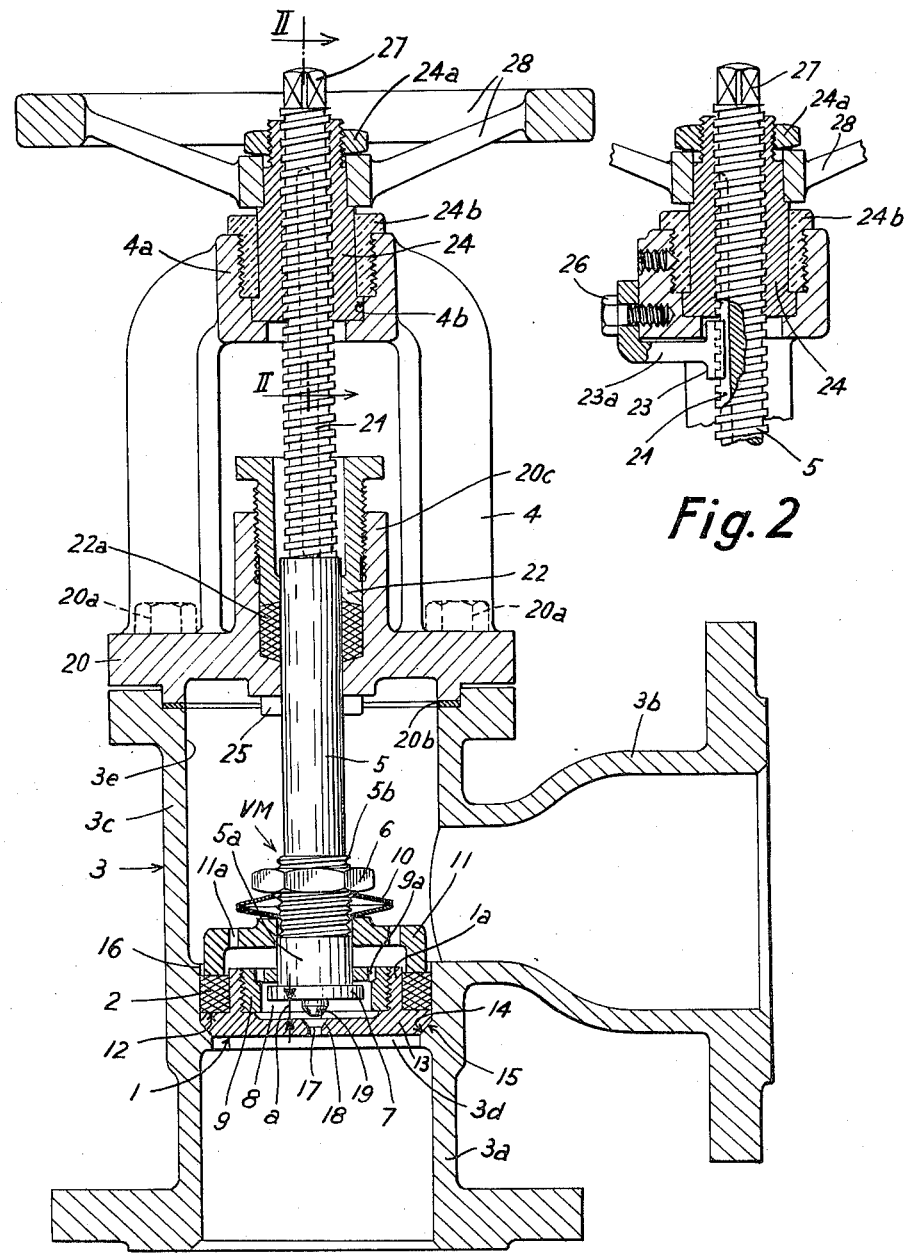

Oct. 12, 1965   H. KLINGER LOHR   3,211,419
PISTON VALVE WITH SPRING PRESSED HEAD
Filed Jan. 17, 1961

INVENTOR:
HUBERT KLINGER LOHR

Michael S. Striker

BY his ATTORNEY

United States Patent Office 3,211,419
Patented Oct. 12, 1965

3,211,419
PISTON VALVE WITH SPRING PRESSED HEAD
Hubert Klinger-Lohr, Modling, Lower Austria, Austria, assignor to Istag A.G., Suhr, Aargau, Switzerland
Filed Jan. 17, 1961, Ser. No. 83,325
Claims priority, application Austria, Feb. 12, 1960, A 1,111/60
7 Claims. (Cl. 251—186)

The present invention relates to shut-off valves in general, and more particularly to improvements in shut-off valve assemblies comprising an axially reciprocable valve member whose piston-like head is movable into and away from sealing engagement with a seat in a restricting portion of the valve housing. Still more particularly, the invention relates to a shut-off valve assembly wherein the head of the valve member carries a sealing element adapted to provide a fluid-tight seal between the head and the restricting portion of the valve housing.

As is known, the shut-off valves with an axially reciprocable valve member which is provided with a piston-like head may be divided into a first group wherein the sealing element is carried by the head of the valve member and a second group in which the sealing element is embedded in the valve housing. The advantage of the first group is that the valve is of more compact design and that it is usually more convenient to replace the sealing element. However, the physical and/or chemical action of the fluids causes a more rapid loosening of the sealing element if the latter is rigidly connected to and is movable with the valve member. The fluid medium comes into direct contact with the head of the valve member and, owing to different heat expansion in different zones of the valve member, the sealing element becomes loose after comparatively short periods of actual use. Such tendency of a rigidly retained sealing element to become loose is enhanced by the wear and by the shrinking and eroding action of certain solvents which are often present in the conveyed fluid.

It was already proposed to compensate for the loosening of a sealing element which is carried by the head of a valve member by providing a threaded compressing device which renders it possible to subject the sealing element to a greater compressive force as soon as the sealing element becomes loose. However, such constructions have met with little success because, when the shut-off valve is in actual use, the persons in charge frequently forget to adjust the compressive force upon the sealing element until after it is too late, i.e., after the sealing element is corroded and worn away to such an extent that any subsequent compression cannot sufficiently increase its radial dimensions to insure satisfactory sealing of the valve member against the housing. Furthermore, such adjustments normally necessitate a complete dismantling of the valve which causes undesirable and lengthy interruptions in the operation of the system in which the valve is installed and losses in man hours.

Accordingly, it is an important object of the present invention to provide a shut-off valve with an axially movable valve member whose head carries a sealing element and which is constructed and assembled in such a way that the sealing element is invariably compressed at least when the valve member is in sealing position and properly seals the valve member against the housing even if it should wear away by friction and should become corroded or would shrink under the action of conveyed fluids.

Another object of the invention is to provide a valve assembly of the just outlined characteristics wherein the sealing element is permanently subjected to at least some compression and wherein the adjustments in the compression of the sealing element, if necessary, may be carried out without necessitating a dismantling of the valve assembly.

A further object of the instant invention is to provide a valve assembly of the above described type wherein the compressive force acting on the sealing element is reduced or terminated in a fully automatic way when the head of the valve member is moved to its non-sealing position.

An additional object of the present invention is to provide a shut-off valve of the above outlined characteristics which comprises a small number of component parts, which requires little attention and provides a reliable seal for extended periods of actual use, and wherein different heat expansion in different zones of the valve member cannot affect the sealing action of the sealing element.

A concomitant object of the invention is to provide a shut-off valve of the above outlined characteristics whose sealing action may be varied within a wide range and which may be constructed and assembled in such a way as to permit a fully controlled flow of very small or very large fluid quantities from the inlet to the outlet of the valve housing.

With the above objects in view, the invention resides in the provision of a shut-off valve whose housing is provided with an annular restricting portion and axially movably guides a valve member whose head comprises two compressing members and a radially expandable sealing element between the compressing members so that, when the head of the valve member is moved into the restricting portion of the valve housing and the compressing members cause a radial expansion of the sealing element, the latter sealingly engages with the wall of the restricting portion and prevents the flow of a fluid from the inlet to the outlet of the valve housing. At least that compressing member which is the first to enter the restricting portion of the valve housing is axially movable on the spindle of the valve member between an abutment of the spindle and the other compressing member and engages with a suitable fixed stop in the restricting portion so as to be automatically displaced along the spindle toward the other compressing member and to thereby bring about radial expansion of the sealing element. The fixed stop in the valve housing may assume the form of an annular valve seat, and it is preferred to provide a resilient element which operates against an adjustable nut or the like and permanently biases the compressing member more distant from the aforementioned stop into compressive contact with the sealing element. This insures that the sealing element is subjected to at least some compression regardless of whether of not the head of the valve member is received in the restricting portion of the valve housing.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompany drawings, in which:

FIG. 1 is a vertical section through a shut-off valve assembly embodying my invention; and FIG. 2 is a fragmentary section taken along the line II—II of FIG. 1 as seen in the direction of arrows.

Referring now in greater detail to the drawings, and first to FIG. 1, there is shown a shut-off valve assembly in the form of an angle type globe valve which comprises a housing or body 3 formed with two flanged nipples 3a, 3b respectively constituting the inlet and the outlet for a fluid medium, or vice versa. The housing 3 carries a detachable upward extension or bonnet 4 whose end plate 20 is sealingly secured to the housing by bolts 20a or the like to compress an annular packing 20b therebetween. The lower part of the sealable cylindrical restricting portion 3c of the housing 3 above the nipple 3a is provided with a fixed stop in the form of an annular inwardly extending valve seat 3d which is formed with an upwardly and outwardly diverging conical upper face 15. Above the seat 3d, the housing 3 accommodates the piston-shaped head of a valve member VM whose axially shiftable spindle 5 projects upwardly through the end plate 20 and beyond the bonnet 4. The head of the valve member VM comprises two main components 1, 11 which act as compressing members and which are axially movable along the spindle 5. In accordance with a preferred embodiment of my invention, the compressing members 1, 11 are permanently under the bias of a resilient element in the form of a so-called bent plate spring 10 so as to compress an elastically deformable annular sealing element in the form of a composition washer 2. This sealing element may be a unitary body or it may consist of several superimposed washers. The bonnet 4 permits axial but normally prevents angular displacements of the spindle 5 with respect thereto so that, when the spindle is axially displaced, the compressing members 1, 11 and the sealing element 2 are movable in directions toward and away from the fixed stop or seat 3d.

The lower compressing member 1 assumes the shape of a cup and is retained by and coupled to a collar-shaped end portion 7 of the spindle 5 in such a way that, in the absence of the resilient element 10, it would be free to perform axial movements through a distance a. In addition to the collar 7, the means for coupling the compressing member 1 to the spindle 5 comprises an externally threaded ring member 9 which actually forms a part of and is screwed into a coaxial blind bore 8 extending downwardly from the upper side of the member 1. The ring member 9 is preferably free to rotate about the boss 5a of the spindle 5 and is adapted to engage the upper side of the collar 7. It will be noted that the axial play a of the lower compressing member 1 equals the axial length of the bore 8 minus the combined thickness of the ring member 9 and the collar 7. The compressing member 1 is provided with an annular flange 13 whose upper side forms a shoulder for the underside 12 of the sealing element 2 and whose underside is formed with an upwardly and outwardly diverging valve face 14 which is adapted to move into sealing face-to-face contact with the conical face 15 of the fixed valve seat 3d. The upwardly extending cylindrical portion 1a of the compressing member 1 is in contact with the inner side of the sealing element 2, and the latter's upper side is engaged by the underside of the substantially inverted cup-shaped upper compressing member 11. The upper side of the member 11 which latter is rotatable about and is axially movable along the lower end portion of the spindle 5 is engaged by the resilient element 10 whose bias is adjustable by a nut 6 screwed onto an externally threaded portion 5b of the spindle just above the boss 5a.

The outer side of the sealing element 2 is in sealing contact with the cylindrical inner wall of a bore 16 provided in the restricting portion 3c of the housing 3 above the valve seat 3d and, owing to the bias of the resilient element 10, the elastically deformable sealing element will prevent the communication of a fluid medium between the nipples 3a, 3b when it is received in the bore 16. In addition, the resilient element 10 causes the upper compressing member 11 and the sealing element 2 to transmit its bias to the lower compressing member 1 so that the latter's conical face 14 is in sealing abutment with the conical face 15 of the valve seat 3d. In the position of FIG. 1, the sealing element 2 is only partly compressed and the downwardly directed force acting upon the compressing member 1 is below the maximum magnitude because the spindle 5 is free to continue its downward movement to an end position in which the axial clearance a of the member 1 is reduced to zero and in which the resilient element 10 is subjected to maximum compression, the extent of this maximum compression depending on the momentary setting of the adjusting nut 6. Since the sealing element 2 is constantly subjected to a compressive force, its sealing action is insured regardless of temperature changes and regardless of the wear to which it is subjected during actual use for extended periods of time.

The end plate 20 is formed with an upwardly extending stuffing box 20c which receives an annular packing 22a and a gland 22 to prevent the fluid medium contained in the chamber 3e of the valve housing 3 from leaking upwardly about the periphery of the spindle 5.

The means for axially reciprocating the spindle 5 comprises a hand wheel 28 whose hub is non-rotatably connected to an internally threaded sleeve 24 by means of a retaining nut 24a. The sleeve 24 is received in a stepped axial bore 4b formed in the upper end portion 4a of the bonnet 4 and is rotatably retained in the bore 4b by an externally threaded annular member 24b. In order to prevent it from rotating with the sleeve 24, the spindle 5 is formed with an elongated axially parallel peripheral groove 21 which receives a holding means in the form of a tongue 23 provided at the inner end of a radially extending arm 23a whose outer end is removably connected to the upper end portion 4a of the bonnet 4 by means of one or more bolts 26. Thus, when the hand wheel 28 is grasped by hand and is caused to rotate with the sleeve 24, the spindle 5 is compelled to perform an axial movement because it is positively held against rotation by the tongue 23. The latter may be readily separated from the bonnet 4 in order to be disengaged from and to permit angular adjustments of the spindle to thereby adjust the bias of the resilient element 10. To that end, the bolt 26 is removed with the arm 23a after the hand wheel 28 is rotated in a direction to lift the spindle 5 to its upper end position in which the adjusting nut 6 reaches the level of a downwardly extending retaining projection 25 of the end plate 20. The projection 25 is located in the path of the nut 6 and is formed with one or more facets which engage with one or more faces of the nut so as to hold the latter against rotation. If the non-circular upper end 27 of the spindle 5 is then engaged by a suitable wrench or another tool, the spindle may be turned through one or more complete revolutions in order to adjust the bias of the resilient element 10 by causing the nut 6 to travel in the axial direction along the externally threaded spindle portion 5b. Of course, since the valve assembly of FIG. 1 comprises a spindle which is formed with a single groove 21, it is necessary that the spindle be turned through full 360 degrees or through two or more complete revolutions in order to bring the groove 21 into proper position so as to again receive the tongue 23. It will be readily understood that the spindle may be provided with two or more grooves 21 and that the bolt 26 may be selectively secured at two or more different points of the bonnet 4 if it is desired to adjust the bias of the resilient element 10 with greater precision. The adjustments in the bias of the resilient element 10 may be carried out without requiring any dismantling of the valve assembly with the exception that the readily detachable arm 23a must be removed prior to each adjustment.

The improved valve assembly is preferably provided with a relief valve which comprises a coaxial bypass passage 17 in the lower compressing member 1 and a downwardly extending valve member or plug 19 which projects downwardly from the lower end of the spindle 5. The upper portion of the passage 17 is bounded by an upwardly and outwardly diverging conical wall 18 which sealingly receives the conical tip of the relief valve member 19. It will be noted that the relief valve 17, 19 is sealed only when the sealing element 2 is subjected to maximum compression, i.e., the sealing engagement between the conical faces 14, 15 and the sealing engagement of the element 2 with the wall of the bore 16 precede the closing of the relief valve 17, 19. The ring member 9 and the upper compressing member 11 are respectively formed with one or more ports 9a, 11a so as to permit the communication of fluid between the nipples 3a, 3b when the relief valve is at least partially open.

The improved valve assembly is operated as follows:

In the position of FIG. 1, the head of the valve member VM is in sealing position because the sealing element 2 engages with the wall of the bore 16 and because the face 14 of the lower compressing member 1 sealingly engages the conical face 15 of the fixed valve seat 3d. However, since the spindle 5 is still free to continue its downward movement to reduce the axial clearance a of the lower compressing member 1 to zero, the relief valve 17, 19 remains open and permits controlled flow of small quantities of a fluid medium between the nipples 3a, 3b. If the operator continues to rotate the hand wheel 28 in a direction to cause a downward movement of the spindle 5, the clearance a is reduced to zero by simultaneous increase in spring pressure upon the sealing element 2 and upon the lower compressing member 1. Furthermore, the relief valve 17, 19 is closed as soon as the spindle 5 reaches its lower end position because the conical tip of the valve member 19 is then sealingly received in the bore 17 and engages the conical wall 18.

When the hand wheel 28 is rotated in the opposite direction, the spindle 5 is caused to move upwardly and opens the relief valve 17, 19 while the head of the valve member VM still remains in its sealing position. The latter begins to move upwardly and away from the valve seat 3d as soon as the resilient element 10 reaches the condition of minimum compression, i.e., as soon as the upper end face of the collar 7 comes into abutment with the underside of the ring member 9 and begins to lift the lower compressing member 1. Of course, the sealing action of the valve head remains unchanged as long as the sealing element 2 is still received in the bore 16. However, as soon as the sealing element 2 is lifted above this bore, the fluid is free to communicate directly from the nipple 3a to the nipple 3b, or vice versa.

It will be seen that the sealing element 2 is constantly subjected to a certain compressive force exerted by the upper compressing member 11 under the bias of the resilient element 10, and that this compressive force increases when the lower compressing member 1 is moved to its sealing position and when the spindle 5 continues its descent to reduce the axial clearance a. If the valve assembly comprises a resilient element, the latter's bias is adjusted in such a way that the minimal compressive force to which the sealing element is subjected when it is moved upwardly and above the restricting housing portion 3c is just sufficient to insure that the sealing element is not too loose, that the radial shrinkage of and peripheral wear upon the sealing element are fully compensated for by the compressive force of the member 11, but that the radial deformation of the sealing element is not excessive. It will be readily understood that the sealing element is much more susceptible to deformation if it is compressed after being moved from the confines of the cylindrical housing portion 3c. However, when moved into the bore 16, the sealing element must be subjected to a high compressive force in order to insure that its periphery is pressed into satisfactory sealing contact with the wall of the bore 16. Such substantial compressive force is permissible because the radial expansion of the sealing element is limited by the wall of the bore 16 so that the sealing element will provide a fluid tight seal but cannot be deformed to an extent which would necessitate its replacement after short periods of actual use.

It is not important that the face 14 of the lower compressing member 1 come into full sealing contact with the face 15 of the fixed valve seat 3d. The latter actually constitutes a stop for the member 1 so as to cause an axial displacement of the spindle with respect to this member and to bring about a compression and simultaneous radial expansion of the sealing element 2 so that the latter's underside 12 comes into full sealing contact with the upper side of the flange 13 and that the wall of the bore 16 is in sealing engagement with the periphery of the sealing element. In other words, the seat 3d could be replaced by one or more radially inwardly extending lugs as long as such lugs arrest the downward progress of the member 1 when the sealing element 2 is already received in the bore 16.

The resilient element 10 constitutes means for automatically opening the relief valve 17, 19 as soon as the head of the valve member VM, i.e., at least the member 1, has at least some freedom of axial movement with respect to the spindle.

It will be readily understood that the permanently compressed sealing element may be installed in a valve assembly wherein the spindle is rotatable with respect to the valve housing. For example, the spindle may be threaded into a nut which is rotatable therewith in a single direction but which is held against rotation with the spindle in the opposite direction, e.g., the nut may carry a ratchet which engages with a pawl so that the resilient element 10 and the sealing element 2 remain at least slightly compressed in each axial position of the spindle.

The improved valve assembly is particularly suited for use in systems which convey large quantities of a fluid medium and thus require valves wherein the head of the valve member has a large diameter. The radially deformable sealing element insures a very satisfactory sealing action of large valve heads.

If the resilient element 10 is omitted, the nut 6 is adjusted in such a way that the sealing element 2 is not too loose between the compressing members 1, 11 while the head of the valve member is moved out of the bore 16. The compressing action upon the sealing element during downward movement of the valve member begins to increase as soon as the lower compressing member hits the seat 3d.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A shut-off valve comprising, in combination, a valve housing having an inlet and an outlet and comprising an annular portion intermediate said inlet and said outlet; a valve member comprising a spindle having an end portion and axially shiftable in said housing in a first and second direction for respectively moving said end portion into and out of said annular portion, and a head mounted on and movable by said spindle into and out of said annular portion, said head comprising a first annular compressing member axially movably mounted on said spindle, a second annular compressing member axially movably mounted on said spindle between said first member and said end portion, an elastic radially expandable annular sealing element disposed between said compressing members, and resilient means operating between said stem and said first member and arranged to permanently bias said first member into compressive contact with said sealing element so that the sealing element is compressed at all times; and stop means provided in the path of and adapted to arrest said second compressing member when said head is moved into said annular portion whereby, upon further movement of said spindle in said first direction, said second compressing member moves along said spindle toward said first compressing member to cause deformation and to thus increase the bias of said resilient means so as to further compress and radially expand said sealing element into tight sealing engagement with said annular portion.

2. A shut-off valve comprising, in combination, a valve housing having an inlet and an outlet and comprising an annular restricting portion intermediate said inlet and said outlet; a valve member comprising a spindle having an end portion, an externally threaded portion adjacent to said end portion, and axially shiftable in said housing in a first and second direction for respectively moving said end portion into and out of said restricting portion, and a head mounted on and movable by said spindle into and out of said restricting portion, said head comprising a nut screwed onto said threaded portion, a first annular compressing member axially movably mounted on said spindle between said nut and said end portion, a second annular compressing member axially movably mounted on said spindle between said first compressing member and said end portion, an elastic radially expandable annular sealing element disposed between said compressing members, and resilient means provided between said nut and said first member for permanently biasing said first member into compressive contact with said sealing element so that the sealing element is compressed at all times and for biasing said second member into abutment with said end portion; and stop means provided in the path of and adapted to arrest said second compressing member when said head is moved into said restricting portion whereby, upon further movement of said spindle in said first direction, said second compressing member moves along said spindle toward said first compressing member so that the latter compresses said resilient means and the latter's bias increases to bring about further compression and resultant radial expansion of said sealing element into firm sealing engagement with said restricting portion, said nut being adapted to adjust the bias of said resilient means.

3. A shut-off valve comprising, in combination, a valve housing having an inlet and an outlet and comprising an annular restricting portion intermediate said inlet and said outlet; a valve member comprising a spindle having a collar-shaped end portion and axially shiftable in said housing in a first and a second direction for respectively moving said end portion into and out of said restricting portion, and a head mounted on and movable by said spindle into and out of said restricting portion, said head comprising a first compressing member comprising a cupped portion receiving said end portion and a ring member slidable on said spindle and connected with said cupped portion for retaining said end portion with axial play in said cupped portion, a second compressing member axially movably mounted on said spindle, an elastic radially expandable annular sealing element provided between said compressing members and having an inner peripheral surface engaging an outer peripheral surface of said cupped portion, and resilient means for permanently biasing said second member into compressive contact with said sealing element so that the sealing element is compressed at all times and radially expanded to maintain said inner peripheral surface thereof in tight engagement with said outer peripheral surface of said cupped portion and for biasing said ring member into abutment with said end portion; and stop means provided in the path of and adapted to arrest said cupped portion when said head is moved into said restricting portion whereby, upon further movement of said spindle in said first direction, said cupped portion moves toward said end portion to thereby compress and to increase the bias of said resilient means so that the sealing element subjected to greater compressive force and is radially expanded into firm sealing contact with said retaining portion.

4. A shut-off valve comprising, in combination, a valve housing having an inlet and an outlet and comprising an annular restricting portion intermediate said inlet and said outlet; a valve member comprisig a spindle having a collar-shaped end portion and axially shiftable in said housing in a first and a second direction for respectively moving said end portion into and out of said restricting portion, and a head mounted on and movable by said spindle into and out of said restricting portion, said head comprising a first compressing member comprising a cupped portion receiving said end portion and a ring member slidable on said spindle and connected with said cupped portion for retaining said end portion with axial play in said cupper portion, a second compressing member axially movably mounted on said spindle, an elastic radially expandable annular sealing element provided between said compressing members, and resilient means for permanently biasing said second member into compressive contact with said sealing element and for biasing said ring member into abutment with said end portion; stop means provided in the path of and adapted to arrest said cupped portion when said head is moved into said restricting portion whereby, upon further movement of said spindle in said first direction, said cupped portion moves toward said end portion to thereby compress and to increase the bias of said resilient means so that the sealing element is radially expanded into firm sealing contact with said retaining portion; and relief valve means comprising a passage formed in said cupped portion, port means formed in said ring member and said second compressing member, and a relief valve member projecting from said end portion and sealingly received in said passage when said cupped portion is moved into abutment with said end portion, said resilient means automatically opening said relief valve means when said cupped portion is free to move away from said end portion.

5. A shut-off valve comprising, in combination, a valve housing having an inlet and an outlet and comprising an annular restricting portion intermediate said inlet and said outlet; a valve member comprising a spindle having an end portion, an externally threaded portion adjacent to said end portion, and axially shiftable in said housing in a first and second direction for respectively moving said end portion into and out of said restricting portion, and a head mounted on and movable by said spindle into and out of said restricting portion, said head comprising a nut screwed onto said threaded portion, a first annular compressing member axially movably mounted on said spindle between said nut and said end portion, a second annular compressing member axially movably mounted on said spindle between said first compressing member and said end portion, an elastic radially expandable annular sealing element disposed between said compressing members, and resilient means provided between said nut and said first member for permanently biasing said first member into compressive contact with said sealing element and for biasing said second member into abutment with said end portion; stop means provided in the path of and adapted to arrest said second compressing member when said head is moved into said restricting portion whereby, upon further movement of said spindle in said first direction, said second compressing member moves along said spindle toward said first compressing member so that the latter compresses said resilient means and the latter's bias increases to bring about radial expansion of said sealing element into firm sealing engagement with said restricting portion; and means for axially moving said nut with respect to said spindle and for thereby adjusting the bias of said resilient means, said moving means comprising retaining means provided in said housing and located in the path of said nut when the spindle is moved in said second direction, said retaining means adapted to engage with and to prevent rotation of said nut whereby, upon rotation of said spindle in said housing, said nut is axially shifted with respect to said spindle.

6. A shut-off valve comprising, in combination, a valve housing having an inlet and an outlet and comprising an annular restricting portion intermediate said inlet and said outlet; a valve member comprisig a spindle having an end portion, an externally threaded portion adjacent to said end portion, and axially shiftable in said housing in a first and second direction for respectively moving said end portion into and out of said restricting portion, and a head mounted on and movable by said spindle into and out of said restricting portion, said head comprising a nut screwed onto said threaded portion, a first annular compressing member axially movably mounted on said spindle between said nut and said end portion, a second annular compressing member axially movably mounted on said spindle between said first compressing member and said end portion, an elastic radially expandable annular sealing element disposed between said compressing members, and resilient means provided between said nut and said first member for permanently biasing said first member into compressive contact with said sealing element and for biasing said second member into abutment with said end portion; stop means provided in the path of and adapted to arrest said second compressing member when said head is moved into said restricting portion whereby, upon further movement of said spindle in said first direction, said second compressing member moves along said spindle toward said first compressing member so that the latter compresses said resilient means and the latter's bias increases to bring about radial expansion of said sealing element into firm sealing engagement with said restricting portion; holding means connected with said housing for releasably engaging and for preventing the rotation of said spindle with respect to said housing; and means for axially moving said nut with respect to said spindle and for thereby adjusting the bias of said resilient means, said moving means comprising retaining means provided in said housing and formed with at least one facet located in the path of said nut when the spindle is moved in said second direction, said retaining means adapted to engage with and to prevent rotation of said nut whereby, upon disengagement of said holding means and upon rotation of said spindle in said housing, said nut is axially shifted with respect to said spindle.

7. A shut-off valve comprising, in combination, a valve housing having an inlet and an outlet and comprising an annular restricting portion intermediate said inlet and said outlet; a valve member comprising a spindle having an end portion, an externally threaded portion adjacent to said end portion, and axially shiftable in said housing in a first and second direction for respectively moving said end portion into and out of said restricting portion, and a head mounted on and movable by said spindle into and out of said restricting portion, said head comprising a nut screwed onto said threaded portion, a first annular compressing member axially movably mounted on said spindle between said nut and said end portion, a second annular compressing member axially movably mounted on said spindle between said first compressing member and said end portion, an elastic radially expandable annular sealing element disposed between said compressing members, and a bent plate spring provided between said nut and said first member for permanently biasing said first member into compressive contact with said sealing element so that said sealing element is compressed at all times and for biasing said second member into abutment with said end portion; and stop means provided in the path of and adapted to arrest said second compressing member when said head is moved into said restricting portion whereby, upon further movement of said spindle in said first direction, said second compressing member moves along said spindle toward said first compressing member so that the latter compresses said spring and the latter's bias increases to bring about further compression and resultant radial expansion of said sealing element into firm sealing engagement with said restricting portion, said nut being adapted to adjust the bias of said spring.

References Cited by the Examiner

UNITED STATES PATENTS

| | | | |
|---|---|---|---|
| 678,994 | 7/01 | Burroughs | 251—191 |
| 1,111,244 | 9/14 | Wilson | 251—191 X |
| 1,166,638 | 1/16 | Schiller | 251—186 |
| 1,371,575 | 3/21 | Rousseau | 251—260 |
| 2,200,226 | 5/40 | Larson | 137—630.14 |
| 2,635,846 | 4/53 | Smith | 251—357 X |

FOREIGN PATENTS

| | | |
|---|---|---|
| 454,546 | 10/36 | Great Britain. |
| 134,527 | 7/29 | Switzerland. |

ISADOR WEIL, *Primary Examiner.*

WILLIAM F. O'DEA, *Examiner.*